US010864063B2

(12) United States Patent
Brun

(10) Patent No.: US 10,864,063 B2
(45) Date of Patent: Dec. 15, 2020

(54) DENTAL IMPLANT REPLICA

(71) Applicant: NOBEL BIOCARE SERVICES AG, Kloten (CH)

(72) Inventor: Philipp Brun, Zürich (CH)

(73) Assignee: Nobel Biocare Services AG, Kloten (CH)

( * ) Notice: Subject to any disclaimer, the term of this patent is extended or adjusted under 35 U.S.C. 154(b) by 618 days.

(21) Appl. No.: 15/029,106

(22) PCT Filed: Oct. 10, 2014

(86) PCT No.: PCT/EP2014/071793
§ 371 (c)(1),
(2) Date: Apr. 13, 2016

(87) PCT Pub. No.: WO2015/055541
PCT Pub. Date: Apr. 23, 2015

(65) Prior Publication Data
US 2016/0250008 A1 Sep. 1, 2016

(30) Foreign Application Priority Data
Oct. 15, 2013 (GB) .................................. 1318235.7

(51) Int. Cl.
A61C 13/34 (2006.01)
A61C 13/00 (2006.01)
(Continued)

(52) U.S. Cl.
CPC ............ A61C 13/34 (2013.01); A61C 8/0001 (2013.01); A61C 13/0019 (2013.01); A61C 9/0053 (2013.01)

(58) Field of Classification Search
CPC . A61C 13/34; A61C 13/0004; A61C 13/0019; A61C 8/0001; A61C 9/0053
(Continued)

(56) References Cited

U.S. PATENT DOCUMENTS 4,801,264 A 1/1989 Weissman
5,662,476 A 9/1997 Ingber et al.
(Continued)

FOREIGN PATENT DOCUMENTS

DE 10315399 9/2004
EP 0687449 3/2000
(Continued)

OTHER PUBLICATIONS

International Search Report for Application No. PCT/EP2014/071793 dated Dec. 23, 2014 in 3 pages [the ISR for the PCT Application of the US National Phase Application].

Primary Examiner — Heidi M Eide
Assistant Examiner — Drew S Folgmann
(74) Attorney, Agent, or Firm — Knobbe, Martens, Olson & Bear, LLP

(57) ABSTRACT

The present invention relates to a dental implant replica (10) for a physical dental model (36), the dental implant replica including: a coronal end (14); an apical end (18); a coronal portion (12) extending to the coronal end; an cylindrical apical portion (16) extending to the apical end and including a circumventing indentation (20); an anti-rotation portion (26) located between the coronal portion and the apical portion and including at least one external convex element (28; 28a-c) extending in a longitudinal direction of the dental implant replica; and a prosthetic connection interface (34) located at the coronal end. The present invention also relates to a system including a dental implant replica and a physical dental model, a 3D printed or milled dental model, and a method of installing a dental implant replica in a dental model.

10 Claims, 5 Drawing Sheets

(51) Int. Cl.
*A61C 8/00* (2006.01)
*A61C 9/00* (2006.01)

(58) Field of Classification Search
USPC .......................................... 433/73–76, 201.1
See application file for complete search history.

(56) References Cited

U.S. PATENT DOCUMENTS

| | | | |
|---|---|---|---|
| 5,674,073 | A | 10/1997 | Ingber et al. |
| 5,752,831 | A | 5/1998 | Padros-Fradera |
| 6,048,204 | A | 4/2000 | Klardie et al. |
| 6,261,098 | B1 | 7/2001 | Persson |
| 6,672,869 | B2 * | 1/2004 | Rabenstein ............ A61C 9/002 433/74 |
| 6,733,291 | B1 | 5/2004 | Hurson |
| 6,882,894 | B2 | 4/2005 | Durbin et al. |
| 7,328,077 | B2 | 2/2008 | Durbin et al. |
| 7,425,131 | B2 | 9/2008 | Amber et al. |
| 8,038,442 | B2 | 10/2011 | Hurson |
| 8,185,224 | B2 | 5/2012 | Powell et al. |
| 8,353,703 | B2 | 1/2013 | Amber et al. |
| 8,747,112 | B2 | 6/2014 | Brun |
| 2002/0049009 | A1 | 4/2002 | Rabenstein et al. |
| 2003/0162148 | A1 | 8/2003 | Prestipino |
| 2003/0232304 | A1 * | 12/2003 | Campanello ........... A61C 9/002 433/74 |
| 2008/0261176 | A1 | 10/2008 | Hurson |
| 2010/0124731 | A1 * | 5/2010 | Groscurth ................ A61C 9/00 433/213 |
| 2011/0045432 | A1 * | 2/2011 | Groscurth .............. A61C 1/084 433/75 |
| 2011/0294093 | A1 | 12/2011 | Herweg et al. |
| 2012/0028214 | A1 | 2/2012 | Futterknecht et al. |
| 2012/0282567 | A1 | 10/2012 | Nilsson |
| 2013/0171584 | A1 | 7/2013 | Brun |
| 2014/0242545 | A1 | 8/2014 | Brun |
| 2014/0370459 | A1 | 12/2014 | Hurson |
| 2015/0230897 | A1 | 8/2015 | Bederak |

FOREIGN PATENT DOCUMENTS

| | | |
|---|---|---|
| EP | 1203567 | 5/2002 |
| EP | 1371343 | 12/2003 |
| JP | 2008-541901 | 11/2008 |
| TW | 495358 | 7/2002 |
| WO | WO 2012/095851 A2 | 7/2012 |
| WO | WO 2013/027199 A1 | 2/2013 |

* cited by examiner

DENTAL IMPLANT REPLICA

CROSS-REFERENCE TO RELATED APPLICATIONS

This application is a national stage application under 35 U.S.C. § 371 of International Application No. PCT/EP2014/071793, filed on Oct. 10, 2014, which published in English as WO 2015/055541 A1 on Apr. 23, 2015, and which claims priority benefit of GB Patent Application No. 1318235.7, filed on Oct. 15, 2013.

The present invention relates to a dental implant replica for a physical dental model. The present invention also relates to a system comprising a dental implant replica and a physical dental model. The present invention also relates to a 3D printed or milled dental model. The present invention also relates to a method of installing a dental implant replica in a dental model.

US2011294093 (Straumann Holding AG) discloses an analog implant for a dental model which has such a geometry as to allow its height positioning, axial positioning and angular orientation in a bore or blind hole of a dental model, the analog implant having a distal portion and a proximal portion, where the proximal portion has a rotationally symmetric geometry in a cross-section which is perpendicular to the axis of the proximal portion, where the rotationally symmetric geometry is adapted to ensure securing against rotation and repositioning of the analog implant in a bore or blind hole of a dental model, the external geometry of the proximal portion being such that the analog implant can be removed from the dental model, and where a proximally positioned shoulder of the distal portion forms a height stop which allows precise height positioning of the analog implant on the dental model or on the soft tissue of the dental model, respectively. The proximal portion has at least two flattened areas or recesses. A threaded bore can be provided on the analog implant for securing to the dental model.

WO2012095851 (Cadent Ltd.) discloses a system and method for manufacturing a physical model of a dental structure that includes a dental implant. The physical model is configured to allow a dental analog can be inserted into the physical model in a general coronal direction. The dental analog comprises a first apical analog end corresponding to an insertion opening and a second coronal analog end corresponding, and wherein the second coronal analog end has a smaller maximum width than a maximum width of the first apical analog end. However, a "bottom-up" inserted dental analog can be pushed out or displaced by mistake during manipulation, for example if a dental technician applies too much force on an associated restoration or prosthetic component during installation.

It is an object of the present invention to provide an improved dental implant replica. In particular, it is an object to provide a dental implant replica having an improved anti-rotation feature and/or an improved securing mechanism.

The present invention is defined in the appended independent claims. Embodiments are defined in the appended dependent claims.

According to an aspect of the present invention, there is provided a dental implant replica for a physical dental model, the dental implant replica comprising: a coronal end; an apical end; a coronal portion extending to the coronal end; an cylindrical apical portion extending to the apical end and including a circumventing indentation; an anti-rotation portion located between the coronal portion and the apical portion and including at least one external convex element extending in a longitudinal direction of the dental implant replica; and a prosthetic connection interface located at the coronal end.

The anti-rotation portion may include three external convex elements each extending in the longitudinal direction of the dental implant replica, the three external convex elements being uniformly distributed about the circumference of the anti-rotation portion.

The coronal portion may be cylindrical and have a first diameter, wherein the cylindrical apical portion has a second diameter, and wherein the first diameter is greater than the second diameter. A greatest cross-sectional distance of the anti-rotation portion perpendicular to the longitudinal direction may be the same or smaller than the first diameter of the coronal portion but greater than the second diameter of the cylindrical apical portion.

The cylindrical apical portion may be provided with a chamfer at the apical end.

The circumventing indentation has a U-shaped cross-section.

The circumventing indentation may be provided on the lower or apical half of the cylindrical apical portion.

According to another aspect of the present invention, there is provided a system comprising a dental implant replica and a physical dental model, wherein the physical dental model comprises a hole adapted to receive the dental implant replica and including an anti-rotation section having at least one concave recess adapted to substantially match the at least one external convex element of the dental implant replica, wherein the hole of the physical dental model further includes a cylindrical section with at least one protrusion adapted to engage with the circumventing indentation of the cylindrical apical portion of the dental implant replica, such that the dental implant replica may be locked in the longitudinal direction relative to the physical dental model. This aspect of the invention may exhibit the same or similar features and/or technical effects as the previously mentioned aspect.

According to another aspect of the present invention, there is provided a 3D printed or milled dental model comprising a hole adapted to receive a dental implant replica, wherein the hole includes an anti-rotation section having at least one concave recess extending in a longitudinal direction of the hole, wherein the hole further includes a cylindrical section located apically of the anti-rotation section, the cylindrical section comprising at least one radially extending protrusion. This aspect of the invention may exhibit the same or similar features and/or technical effects as the previously mentioned aspects.

The anti-rotation section may further include a plurality of longitudinal, deformable ribs.

The cylindrical section may further include an expanded region located between the anti-rotation section and the at least one protrusion.

According to another aspect of the present invention, there is provided a method of installing a dental implant replica in a dental model, which method comprises: inserting the dental implant replica in the hole of the dental model from a coronal side of the dental model, such that the at least one protrusion of the dental model snap-fits into the circumventing indentation of the dental implant replica, thereby locking the dental implant replica in the longitudinal direction relative to the dental model. This aspect of the invention may exhibit the same or similar features and/or technical effects as the previously mentioned aspects.

The method may comprise: receiving data of an intraoral scan of an oral situation of a patient, the oral situation including an installed dental implant optionally with a position locator; and 3D printing the dental model including the hole based on the data of intraoral scan, wherein the position of the hole corresponds to the position of the installed dental implant.

These and other aspects of the present invention will now be described in more detail, with reference to the appended drawings showing a currently preferred embodiment of the invention.

Figure 1:
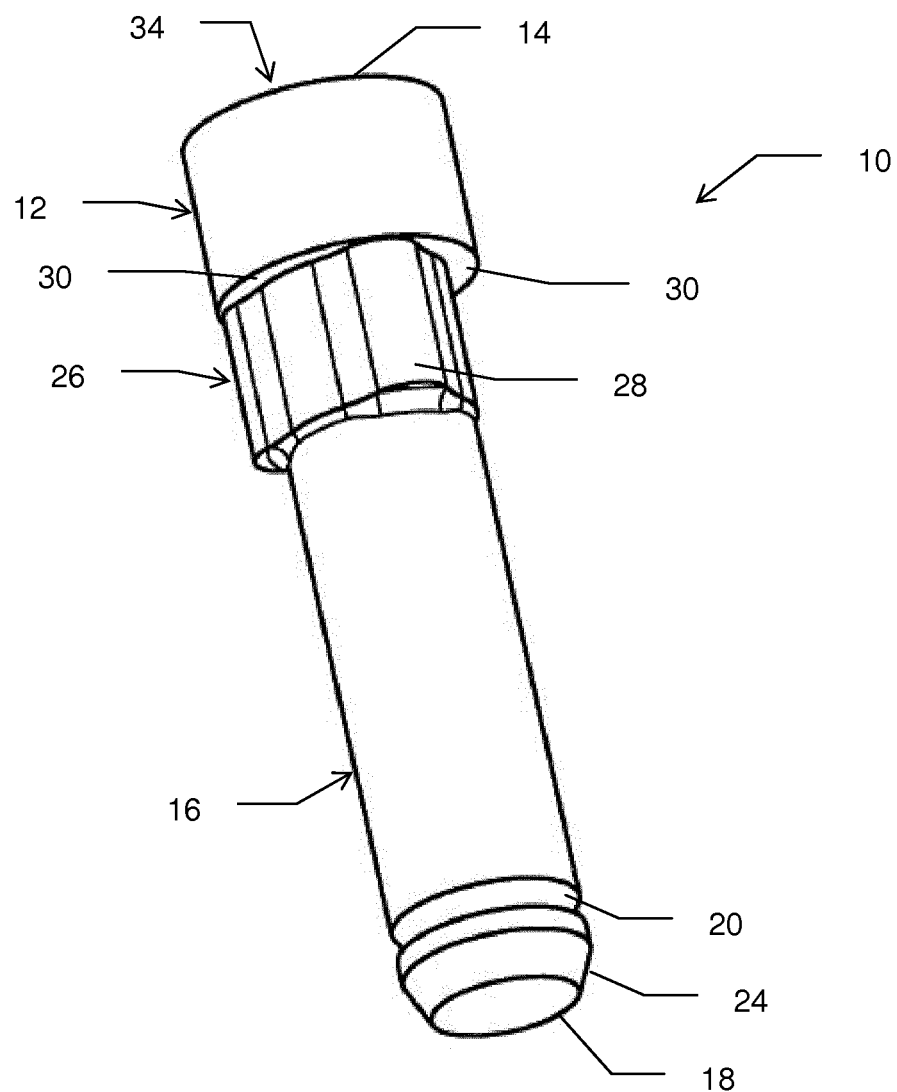
FIG. 1 is a perspective view of a dental implant replica according to an embodiment of the present invention.
Figure 2:
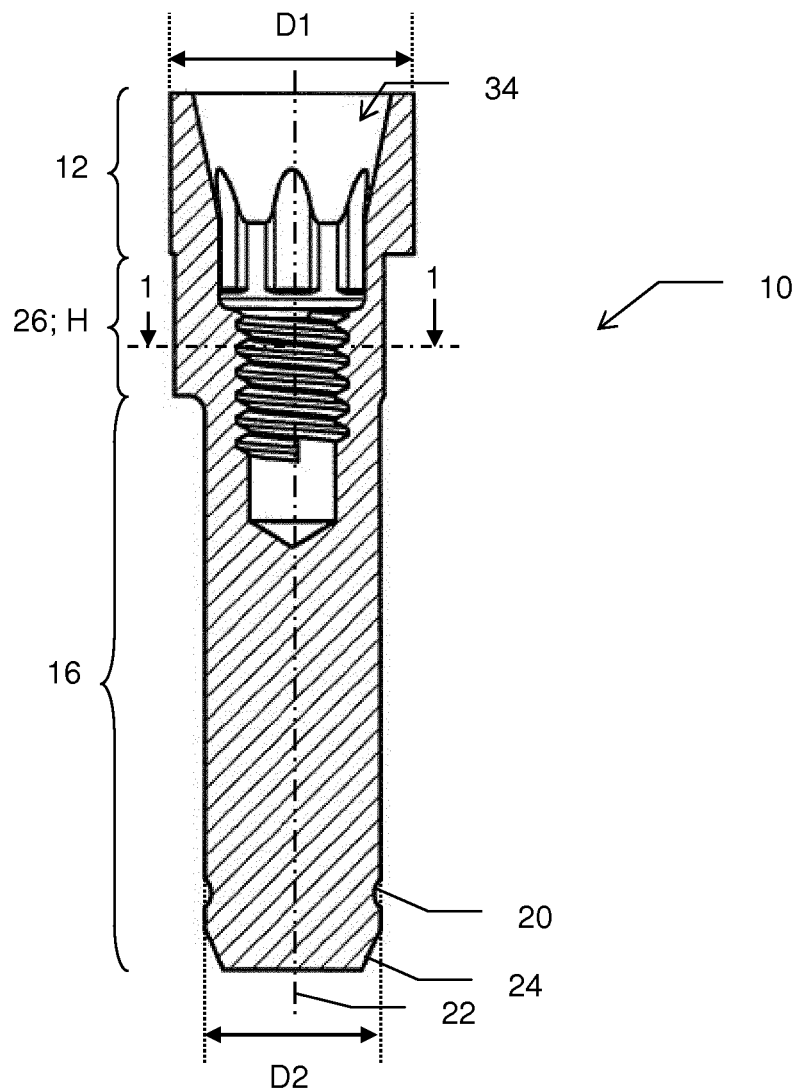
FIG. 2 is a cross-sectional side view of the dental implant replica of FIG. 1.
Figure 3:
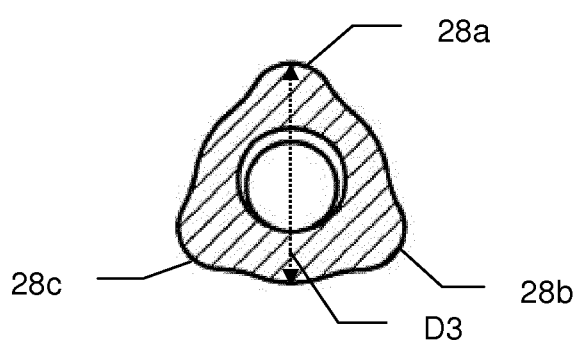
FIG. 3 is a view taken along line 1-1 in FIG. 2.

A dental implant replica 10 according to an embodiment of the present invention will now be described with reference to FIGS. 1-3. The dental implant replica 10 may also be referred to as an implant replica or an implant analog.

The dental implant replica 10 comprises a coronal portion 12 extending to a coronal end 14 of the dental implant replica 10. The coronal portion 12 is preferably cylindrical, and has a first diameter D1.

The dental implant replica 10 further comprises a cylindrical apical portion 16 extending to an apical end 18 of the dental implant analog 10. The cylindrical apical portion 16 has a second diameter D2. The cylindrical apical portion 16 includes a snap-fit element in the form of a circumventing indentation 20. The circumventing indentation 20 preferably extends all around the cylindrical apical portion 16, like a ring. Also, the circumventing indentation 20 is preferably arranged perpendicular to the longitudinal direction of the dental implant replica. The longitudinal direction is defined by a (central) longitudinal axis 22 extending through the coronal end 14 and the apical end 18 of the dental implant replica 10. The circumventing indentation 20 preferably has a U-shaped cross-section. The circumventing indentation 20 is preferably provided on the lower or apical half of the cylindrical apical portion 16. The circumventing indentation 20 may for instance be provided about 1 mm from the apical end 18. The cylindrical apical portion 16 may further be provided with a chamfer 24 at the apical end 18. The apical portion 16 has no protruding element(s) of the type usually found on existing implant replicas for gypsum dental models.

The dental implant replica 10 further comprises an anti-rotation portion 26 located between and preferably adjoining the coronal portion 12 and the apical portion 16. The anti-rotation portion 26 includes at least one external convex element 28 on an otherwise substantially cylindrical surface. The at least one external convex element 28 extends in the longitudinal direction of the dental implant replica 10. The external convex element 28 may also be referred to as a lobe. The at least one external convex element 28 preferably extends the full height H of the anti-rotation portion 26. In the illustrated embodiment, there are three external convex elements 28a-c which are uniformly distributed about the circumference of the anti-rotation portion 26, as best see in FIG. 3. That is, the external convex elements 28a-c are arranged 120 degrees apart. In other embodiments, the number of external convex elements 28 may be one, two, or more than three.

The first diameter D1 of the coronal portion 12 is preferably greater than the second diameter D2 of the cylindrical apical portion 16, and a greatest cross-sectional distance D3 of the anti-rotation portion as seen perpendicular to the longitudinal direction is preferably the same or smaller than the first diameter D1 but greater than the second diameter D2. That is, D2<D3≤D1. To this end, transversal seating areas 30 may be formed between the coronal portion 12 and the anti-rotation portion 26.

The dental implant replica 10 further comprises a prosthetic connection interface 34 located at the coronal end 14 of the dental implant replica 10. The illustrated prosthetic connection interface 34 is an internal conical connection interface, but other prosthetic connection interface may be used as well, such as internal tri-channel connection or external hexagonal. By means of the prosthetic connection interface 34, a prosthetic component (not shown), such as an abutment, a bar, a crown, a bridge, etc., may be connected to the dental implant replica 10.

The dental implant replica 10 is preferably made in one piece. It can for instance be made of metal, such as titanium.

The dental implant replica 10 is preferably used together with a physical dental model 36, see FIGS. 4-7.

The dental model 36 according to an embodiment of the present invention comprises a hole 38 adapted to receive the dental implant replica 10. The hole 38 may also be referred to as a bore. The hole 38 is preferably a through hole as in the illustrated embodiment, but it could alternatively be a blind hole. The longitudinal axis of the hole 38 is denoted 51.

Figure 6:
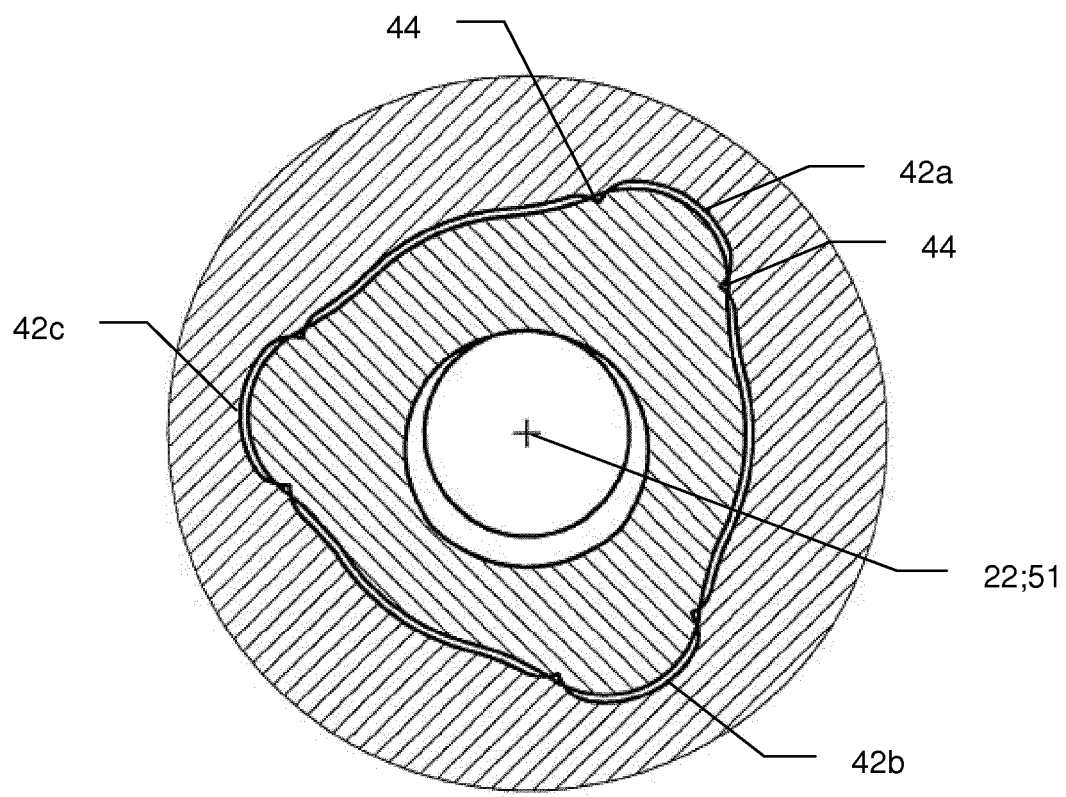
FIG. 6 is a view taken along line 2-2 in FIG. 4.
Figure 7:
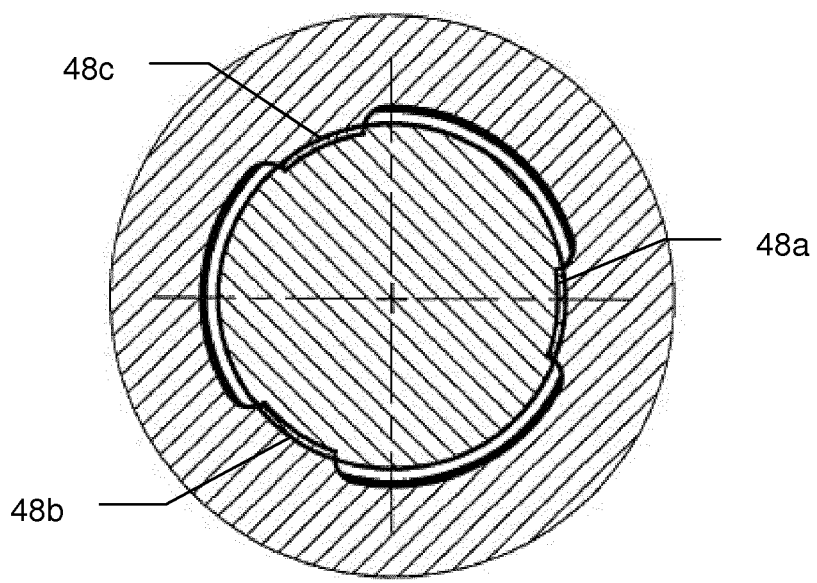
FIG. 7 is a view taken along line 3-3 in FIG. 4.

The hole 38 includes an anti-rotation section 40 having at least one concave recess 42 adapted to substantially match the at least one external convex element 28 of the dental implant replica 10. In the illustrated embodiment, there are three concave recesses 42a-c corresponding to the external convex elements 28a-c, as seen in FIG. 6. The anti-rotation section 40 may further comprise a plurality of longitudinal deformable ribs 44. Preferably, there are two ribs 44 for each concave recesses 42.

The hole 38 further includes a substantially cylindrical section 46 with at least one protrusion 48 adapted to engage with the circumventing indentation 20 of the cylindrical apical portion 16 of the dental implant replica 10. The at least one protrusion 48 extends radially into the hole 38. The at least one protrusion 48 may be three knobs 48a-c as in the illustrated embodiment, see in particular FIG. 7. The three knobs 48a-c may be uniformly distributed about the circumference of the cylindrical section 46. Alternatively, the at least one protrusion 48 may be a single circumventing protrusion (not shown). The cylindrical section 46 is located apically of the anti-rotation section 40. Also, the cylindrical section 46 may further include an expanded region 49 located between the anti-rotation section 40 and the at least one protrusion 48. The expanded region 49 has a larger diameter than remaining regions of the cylindrical section 46.

The hole 38 may further include a coronal section 50 matching all or part of the coronal portion 12 of the dental implant replica 10. In case the entire coronal portion 12 sticks out of the dental model 36, there is no coronal section 50.

The dental model 36 further comprises features related to the oral situation of a patient, such as jaw bone, gum, and/or teeth (not shown). Also, the dental model 36 is preferably 3D printed, as described further below. Alternatively, the dental model 36 may be milled.

Figure 4:
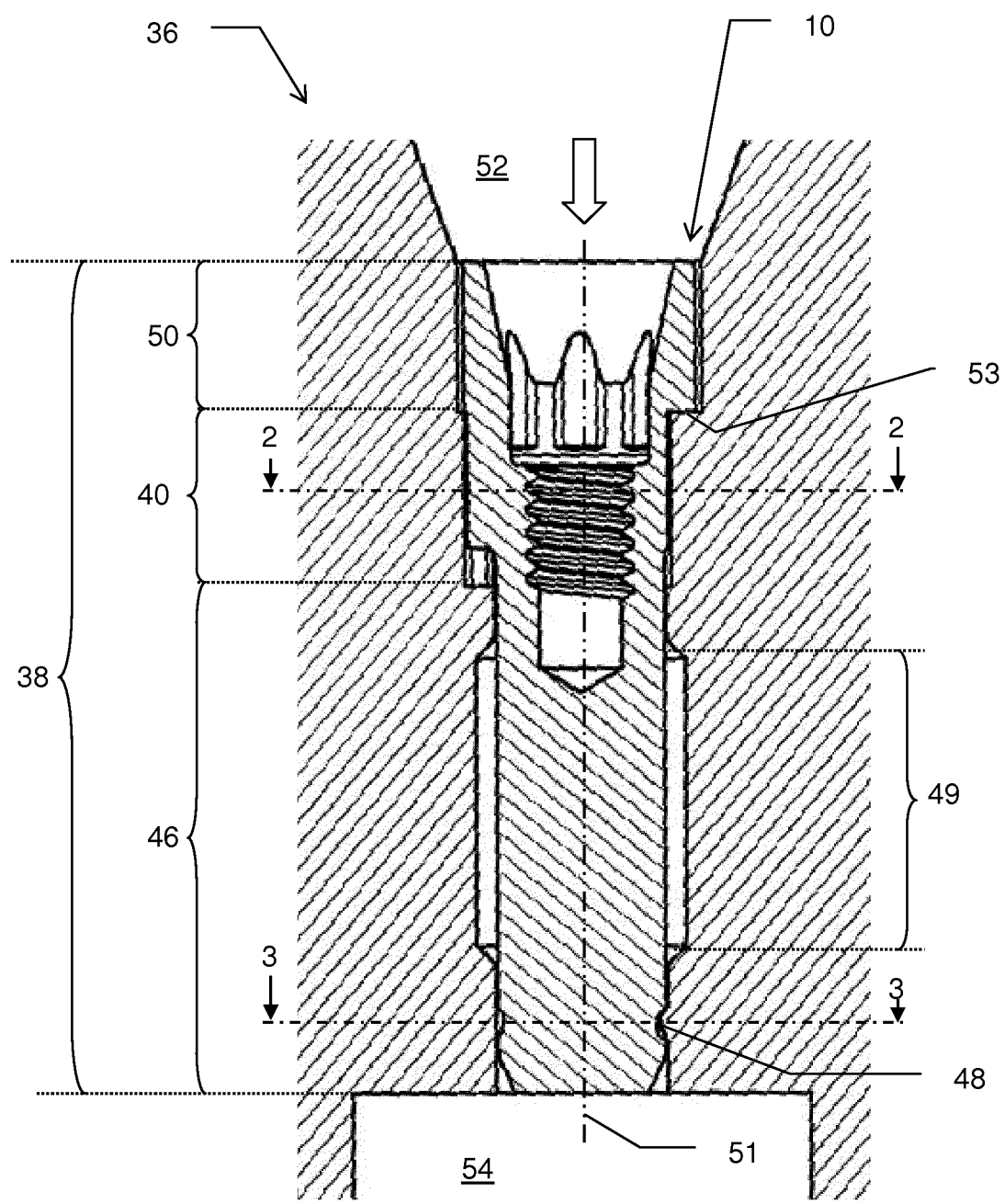
FIG. 4 is a cross-sectional side view of the dental implant replica of FIG. 1 installed in a dental model (partially shown).
Figure 5:
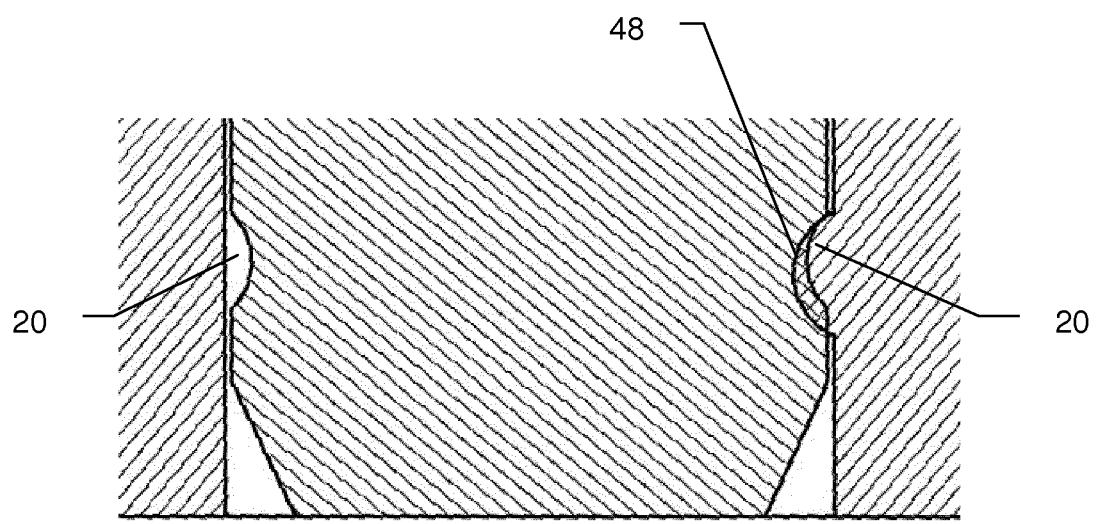
FIG. 5 is a partial enlargement of FIG. 4.

The dental implant replica 10 is inserted from a coronal side 52 ("top-down") of the dental model 36, as illustrated by the arrow in FIG. 4. There is typically no sleeve in the hole 38. The chamfer 24 at the apical end 18 of the dental implant replica 10 may help guiding the dental implant replica 10 into the hole 38.

The dental implant replica 10 should be oriented so that the external convex elements 28a-c line up with the corresponding concave recesses 42a-c of the dental model, to ensure that the dental implant replica 10 does not rotate in the dental model 36. The external convex elements 28a-c and the concave recesses 42a-c ensure accurate placement of the dental implant replica 10 in 120 degrees increments. Further, the deformable ribs 44 may serve to minimize rotational play. Namely, the deformable ribs 44 may be at least somewhat deformed during insertion of the dental implant analog 10. As a result, a radial compression force is applied to the dental implant analog 10, which force is stabilizing and may eliminate any remaining play in rotation.

Further, as the dental implant replica 10 is inserted in the hole 38 of dental model 36 and reaches a predetermined/desired position, the knobs 48a-c of the dental model 36 snap-fit into the circumventing indentation 20 of the dental implant replica 10, thereby locking the dental implant replica 10 in the longitudinal direction relative to the dental model 36. Preferably, the at least one protrusion 48 is positioned slightly lower (apical) compared to the indentation 20 of the dental implant replica, see FIG. 5. The knobs 48a-c may be at least somewhat deformed during insertion of the dental implant replica 10. Due to the deformation, the knobs 48a-c may apply both radial and longitudinal (axial) compression forces on the dental implant replica 10. Longitudinal (axial) compression force may not only result from deformation of the knobs 48a-c but also due to the fact that they are positioned slightly lower compared to the indentation 20. The compression forces are stabilizing the dental implant analog against axial displacement and bending. Also, when the knobs 48a-c of the dental model 36 engage the circumventing indentation 20 of the dental implant replica 10, it may give a tactile and/or audible feedback to the user that the dental implant replica 10 is in the desired position.

By means of the circumventing indentation 20/knobs 48a-c, no additional means, such as a screw, is necessary to secure the dental implant replica 10 in the dental model 36. Also, since the circumventing indentation 20 is located near the apical end 18 of the dental implant replica 10, any gingival mask (not shown) on the coronal side 52 of the dental model 36 would not interfere with the circumventing indentation 20/knobs 48a-c. Also, the transversal seating areas 30 and corresponding seating areas 53 in the hole 38 of the dental model 36 may prevent movement of the dental implant analog 10 relative the dental model 36 in the coronal-to-apical direction.

Also, in the illustrated embodiment wherein the hole 38 in the dental model 36 is a through hole, the dental implant replica 10 may readily be removed from the dental model 36 by inserting a suitable tool (not shown) from the apical side 54 of the dental model 36 and push the dental implant replica 10 in the apical-to-coronal direction with a strong enough force. Also, a user may visually inspect the (inserted) dental implant replica 10 through the hole 38 from the apical side 54 of the dental model 36, to verify correct placement of the dental implant replica 10.

Also, the expanded region 49 of the hole 38 reduces the friction between the dental implant replica 10 and dental model 36 during insertion, which in turn facilitates insertion of the dental implant replica 10 into the dental model 36.

The dental implant replica 10 and the dental model 36 of the present invention are preferably used in conjunction with intraoral scanning. In such an application, a digital intraoral scan of an oral situation of a patient is first taken using an intraoral scanner, for example the TRIOS intraoral scanner available from 3Shape. The oral situation includes a previously installed dental implant, optionally with a position locator attached to the dental implant. Then data from the intraoral scan is received by a dental model manufacturing entity. Thereafter, the dental model 36 including the hole 38 is manufactured by the dental model manufacturing entity using 3D printing technology (also referred to as additive manufacturing). Light polymerised additive manufacturing technology such as DLP (Digital Light Processing) may for example be used. The 3D printed dental model 36 is based on data from the intraoral scan, and the position of the hole 38 corresponds to the position of the installed dental implant. Once the dental model 36 with the hole 38 is manufactured, the dental implant analog 10 may be inserted into the hole 38 of the dental model 36 as described above, either manually or automatically.

The person skilled in the art realizes that the present invention by no means is limited to the preferred embodiments described above. On the contrary, many modifications and variations are possible within the scope of the appended claims.

The invention claimed is:

1. A dental implant replica for a physical dental model, the dental implant replica comprising:
   a coronal end;
   an apical end;
   a coronal portion extending to the coronal end;
   an cylindrical apical portion extending to the apical end and including a circumventing indentation;
   an anti-rotation portion located between the coronal portion and the apical portion and including at least one external convex element extending in a longitudinal direction of the dental implant replica; and
   a prosthetic connection interface located at the coronal end, the prosthetic connection interface having a geometry similar to that of a corresponding prosthetic connection interface disposed on an actual dental implant for which the dental implant replica is an analog.

2. The dental implant replica according to claim 1, wherein the anti-rotation portion includes three external convex elements each extending in the longitudinal direction of the dental implant replica, the three external convex elements being uniformly distributed about the circumference of the anti-rotation portion.

3. The dental implant replica according to claim 1, wherein the coronal portion is cylindrical and has a first diameter, wherein the cylindrical apical portion has a second diameter, and wherein the first diameter is greater than the second diameter.

4. The dental implant replica according to claim 3, wherein a greatest cross-sectional distance of the anti-rotation portion perpendicular to the longitudinal direction is the same or smaller than the first diameter of the coronal portion but greater than the second diameter of the cylindrical apical portion.

5. The dental implant replica according to claim 1, wherein the cylindrical apical portion is provided with a chamfer at the apical end.

6. The dental implant replica according to claim 1, wherein the circumventing indentation has a U-shaped cross-section.

7. The dental implant replica according to claim 1, wherein the circumventing indentation is provided on a lower or apical half of the cylindrical apical portion.

8. A system comprising a dental implant replica according to claim 1 and a physical dental model, wherein the physical dental model comprises a hole adapted to receive the dental implant replica and including an anti-rotation section having at least one concave recess adapted to substantially match the at least one external convex element of the dental implant replica, wherein the hole of the physical dental model further includes a cylindrical section with at least one protrusion adapted to engage with the circumventing indentation of the cylindrical apical portion of the dental implant replica, such that the dental implant replica may be locked in the longitudinal direction relative to the physical dental model.

9. A method of installing a dental implant replica according to claim 1, which method comprises:
    inserting the dental implant replica in a hole of a physical dental model from a coronal side of the physical dental model, such that the at least one protrusion of the dental model snap-fits into the circumventing indentation of the dental implant replica, thereby locking the dental implant replica in the longitudinal direction relative to the physical dental model,
    wherein the hole is adapted to receive the dental implant replica and comprises an anti-rotation section having at least one concave recess adapted to substantially match the at least one external convex element of the dental implant replica, wherein the hole of the physical dental model further includes a cylindrical section with at least one protrusion adapted to engage with the circumventing indentation of the cylindrical apical portion of the dental implant replica, such that the dental implant replica may be locked in the longitudinal direction relative to the physical dental model.

10. The method according to claim 9, comprising:
receiving data of an intraoral scan of an oral situation of a patient, the oral situation including an installed dental implant; and
3D printing the dental model including the hole based on the data of intraoral scan, wherein the position of the hole corresponds to the position of the installed dental implant.

* * * * *